(12) United States Patent
Yoshida et al.

(10) Patent No.: US 9,846,637 B2
(45) Date of Patent: Dec. 19, 2017

(54) MACHINE LEARNING BASED SOFTWARE PROGRAM REPAIR

(71) Applicant: FUJITSU LIMITED, Kawasaki-shi, Kanagawa (JP)

(72) Inventors: Hiroaki Yoshida, Cupertino, UT (US); Divya Gopinath, Santa Clara, CA (US); Mukul R. Prasad, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 50 days.

(21) Appl. No.: 14/957,529

(22) Filed: Dec. 2, 2015

(65) Prior Publication Data
US 2017/0161182 A1    Jun. 8, 2017

(51) Int. Cl.
G06F 11/36    (2006.01)
G06N 99/00    (2010.01)

(52) U.S. Cl.
CPC ...... G06F 11/3692 (2013.01); G06F 11/3688 (2013.01); G06N 99/005 (2013.01)

(58) Field of Classification Search
CPC ............. G06F 11/3409; G06F 11/362; G06F 11/0745; G06F 11/0793; G06F 11/3476; G06F 11/3612; G06F 11/366; G06F 2201/87; G06F 2201/805; G06F 2201/875
See application file for complete search history.

(56) References Cited

U.S. PATENT DOCUMENTS

| | | | | |
|---|---|---|---|---|
| 6,618,853 | B1 * | 9/2003 | Ohyama | G01R 31/31912 700/121 |
| 7,844,666 | B2 * | 11/2010 | Horvitz | G06Q 10/107 709/206 |
| 2007/0101238 | A1 * | 5/2007 | Resnick | G06F 11/106 714/763 |
| 2009/0292941 | A1 * | 11/2009 | Ganai | G06F 11/3636 714/2 |
| 2014/0237455 | A1 * | 8/2014 | Koneru | G06F 11/3688 717/131 |

OTHER PUBLICATIONS

C. Le Goues et al., "GenProg: A Generic Method for Automatic Software Repair," IEEE Transactions on Software Engineering, vol. 38, No. 1, Jan./Feb. 2012.

T. Nguyen, et al., "SemFix: Program Repair via Semantic Analysis," in International Conference on Software Engineering, ser. ICSE 2013, (2013).

(Continued)

*Primary Examiner* — Nadeem Iqbal
(74) *Attorney, Agent, or Firm* — Maschoff Brennan

(57) ABSTRACT

According to an aspect of an embodiment, a method may include identifying a fault location in a software program using a test suite. The method may further include determining, using machine learning, a repair effectiveness indication that indicates a potential effectiveness of performing a potential repair operation at the fault location. In addition, the method may include prioritizing implementing a repair at the fault location based on the repair effectiveness indication. The method may further include performing repair operations with respect to the software program based on the prioritization of the fault location.

19 Claims, 4 Drawing Sheets

(56) References Cited

OTHER PUBLICATIONS

D. Kim, et al., "Automatic Patch Generation Learned from Human-Written Patches," The Hong Kong University of Science and Technology, China, 2013.
DeMarco et al., "Automatic Repair of Buggy If Conditions and Missing Preconditions with SMT," In Proceedings of the 6th International Workshop on Constraints in SoftwareTesting, Verification, and Analysis, CSTVA 2014. ACM (2014).
Kaleeswaran, et al., "MintHint: Automated Synthesis of Repair Hints," International Conference on Software Engineering, ser. ICSE 2014. ACM (2014).
S. H. Tan and A. Roychoudhury, "Relifix: Automated repair of software regressions," in International conference on Software Engineering, ser. ICSE 2015, (2015).
S. Mechtaev, J. Yi, and A. Roychoudhury, "Directfix: Looking for simple program repairs," in International conference on Software Engineering, ser. ICSE '15 (2015).
Z. Qi, F. Long, S. Achour, and M. Rinard. "An Analysis of Patch Plausibility and Correctness for Generate-and-Validate Patch Generation Systems" (ISSTA), Feb. 10, 2015.
F. Long et al., "Staged Program Repair in SPR." Symposium on the Foundations of Software Engineering, FSE Mar. 11, 2015.
Gopinath et al., "Data-guided repair of selection statements" ICSE 2014 (2014).

\* cited by examiner

MACHINE LEARNING BASED SOFTWARE PROGRAM REPAIR

FIELD

The embodiments discussed in the present disclosure are related to machine learning based software program repair.

BACKGROUND

Software programs often have faults in them (commonly referred to as "bugs") in which they may not operate as intended. Often automated repair systems are used in attempt to identify and correct faults in software programs.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include identifying a fault location in a software program using a test suite. The method may further include determining, using machine learning, a repair effectiveness indication that indicates a potential effectiveness of performing a potential repair operation at the fault location. In addition, the method may include prioritizing implementing a repair at the fault location based on the repair effectiveness indication. The method may further include performing repair operations with respect to the software program based on the prioritization of the fault location.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
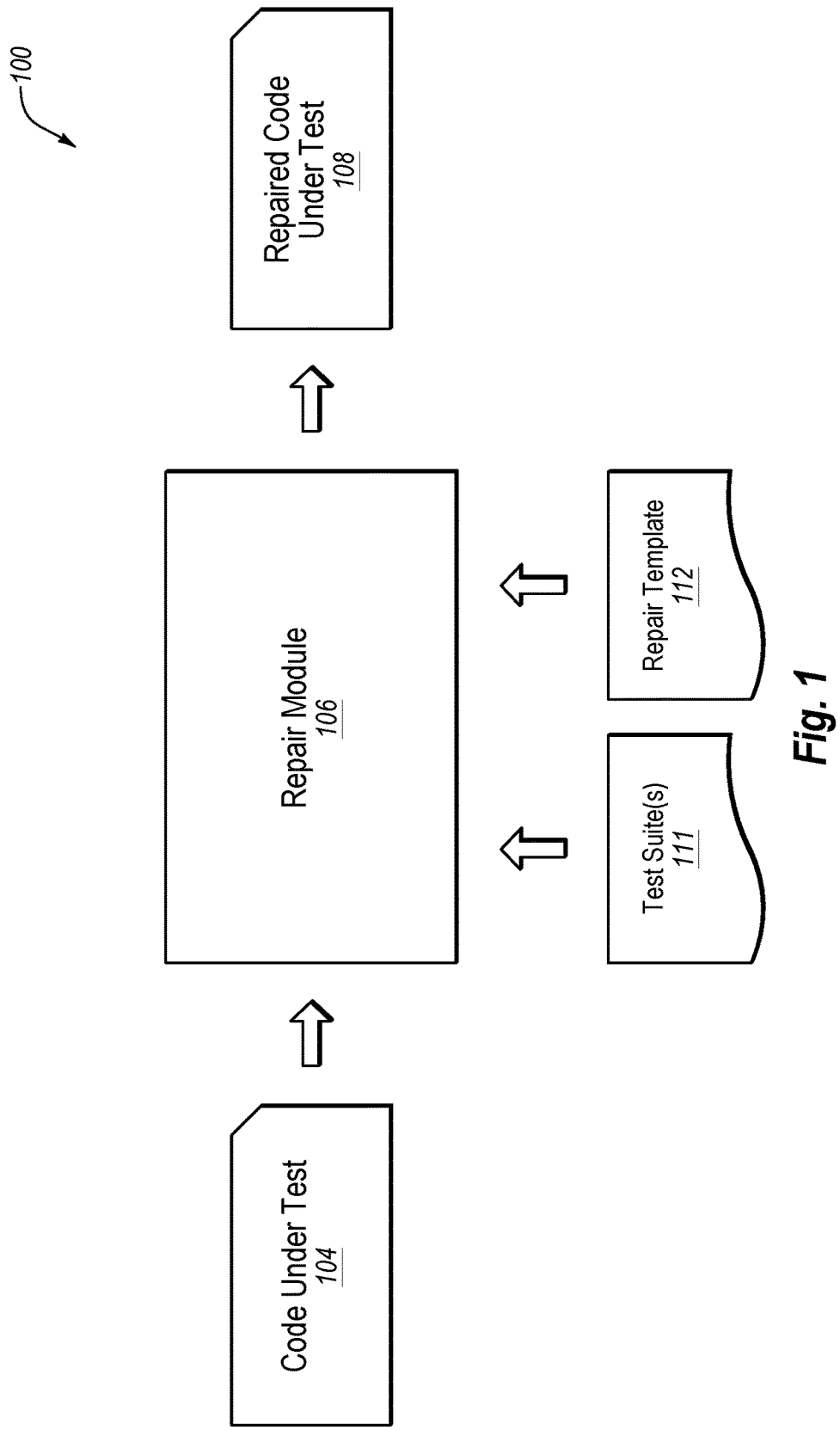
FIG. 1 is a diagram representing an example environment related to repairing a software program.

Some embodiments described in the present disclosure relate to methods and systems of repairing software programs. Software programs often include faults (also commonly referred to as "bugs") that may cause the software programs to behave in an unintended manner. Additionally, automated repair systems and techniques are often used to detect and correct faults to repair software programs. However, commonly used automated repair systems and techniques often make modifications to software programs in attempts to fix faults that do not appropriately repair the fault in the software program. In addition, commonly used automated repair systems and techniques often make modifications to software programs at locations where the repairs may not be very effective.

According to one or more embodiments described in the present disclosure, a repair effectiveness indication may be determined with respect to one or more fault locations of a software program. The fault locations may include portions of the software program executed by failing tests of a test suite ("test execution"). The repair effectiveness indication may be determined using machine learning and may indicate a potential effectiveness of performing potential repair operations at the different fault locations. Further, prioritization of implementing repairs at the fault locations may be performed based on the repair effectiveness indication. Repair operations may then be performed with respect to the software program at one or more of the fault locations based on the prioritization of the fault locations.

In these or other embodiments, one or more repair oracles may be generated using machine learning. In some embodiments, a repair oracle may be generated based on one or more outcomes of the machine learning used to determine a repair effectiveness indication. The repair oracles may each correspond to a fault location. Each repair oracle may predict which states of the software program at the corresponding fault location may result in passing test executions at the corresponding fault location instead of resulting in failing test executions that may have led to identification of the fault location. In some embodiments, a repair oracle may be generated in response to a repair effectiveness indication of its corresponding fault location satisfying a threshold. In these or other embodiments, repairs may be made at a fault location with a repair effectiveness indication that satisfies the threshold using the corresponding repair oracle.

The repair effectiveness determination and corresponding prioritization of fault locations as well as the corresponding performance of repair operations at the fault locations according to the prioritization may improve the efficiency of automated software program repair by reducing instances in which repair operations may be performed at locations where repairs may be relatively ineffective. Further, the repair oracle generation may improve the repairs being made at particular fault locations.

Embodiments of the present disclosure are explained with reference to the accompanying drawings.

FIG. 1 is a diagram representing an example environment 100 related to repairing a software program, arranged in accordance with at least one embodiment described in the present disclosure. The environment 100 may include a repair module 106 configured to analyze code under test 104 for faults. The repair module 106 may also be configured to output modified code under test 108, which may include one or more modifications made to the code under test 104 by repair operations performed by the repair module 106.

The code under test 104 may include electronic data, such as, for example, the software program, code of the software program, libraries, applications, scripts, or other logic or instructions for execution by a processing device. In some embodiments, the code under test 104 may include a complete instance of the software program. Additionally or alternatively, the code under test 104 may include a portion of the software program. The code under test 104 may be written in any suitable type of computer language that may be used for the software program.

The repair module 106 may include code and routines configured to enable a computing device to perform one or more modifications of the code under test 104 to generate the modified code under test 108. Additionally or alternatively, the repair module 106 may be implemented using hardware including a processor, a microprocessor (e.g., to perform or control performance of one or more operations), a field-programmable gate array (FPGA), or an application-specific integrated circuit (ASIC). In some other instances, the repair module 106 may be implemented using a combination of hardware and software. In the present disclosure, operations described as being performed by the repair module 106 may include operations that the repair module 106 may direct a corresponding system to perform.

The repair module 106 may be configured to perform a series of repair operations with respect to the code under test 104 that may be used to repair (also referred to as correct) one or more faults in the code under test 104. In some embodiments, the repair module 106 may be configured to perform one or more of the repair operations based on a repair template 112 and one or more test suites 111.

The repair template 112 may include any suitable type of instructions or routines that, when executed, may be configured to implement one or more modifications with respect to the code under test 104 in response to the presence of faults in the code under test 104. The modifications may include changes in the code under test 104 that may repair or attempt to repair the faults.

The test suites 111 may include one or more routines that may act as test cases for the code under test 104. The test suites 111 may be configured to determine whether the code under test 104 behaves in a specified manner. The test suites 111 may be configured according to any suitable technique.

The repair module 106 may be configured to apply one or more of the test suites 111 with respect to the code under test 104 to detect or determine one or more faults and corresponding fault locations in the code under test 104. In some embodiments, the repair module 106 may be configured to execute one or more tests included in the test suites 111, which may be referred to as performing a test execution. A test execution that passes may be referred to as a "passing test execution" and a test execution that fails may be referred to as a "failing test execution." In some embodiments, a fault location and corresponding fault of the code under test 104 may be identified based on a failing test execution executing code appearing at the fault location.

The repair module 106 may be configured to use machine learning to determine a repair effectiveness indication for one or more of the identified fault locations. The repair module 106 may also be configured to prioritize implementing repairs at the different fault locations based on the corresponding repair effectiveness indication. In some embodiments, the prioritization may include determining whether or not to perform repair operations at the fault locations. In these or other embodiments, the determination to perform repair operations may be based on the repair effectiveness indication satisfying a threshold. In some embodiments, the repair module 106 may be configured to determine the repair effectiveness indication according to one or more operations described below with respect to methods 300 and 400 of FIGS. 3 and 4.

In these or other embodiments, the repair module 106 may be configured to perform repair operations at a particular fault location based on a particular repair oracle that may be generated by the repair module 106. The repair module 106 may be configured to generate the particular repair oracle using machine learning that may be based on program states of the software program at the particular fault location that may result in one or more passing or failing test executions. In the present disclosure, a program state that results in a passing test execution may be referred to as a "passing program state" and a program state that results in a failing test execution may be referred to as a "failing program state." In these or other embodiments, the particular repair oracle may be based on an outcome of machine learning that may be used to determine the repair effectiveness indication of the particular fault location. In some embodiments, the repair module 106 may be configured to generate the repair oracle according to one or more operations described below with respect to methods 300 and 400 of FIGS. 3 and 4.

Modifications, additions, or omissions may be made to FIG. 1 without departing from the scope of the present disclosure. For example, the environment 100 may include more or fewer elements than those illustrated and described in the present disclosure. In addition, in some embodiments, one or more routines, one or more instructions, or at least a portion of code of the repair module 106, the test suites 111, and the repair template 112 may be combined such that they may be considered the same thing or may have common sections that may be considered part of two or more of the repair module 106, the test suites 111, and the repair template 112.

Figure 2:
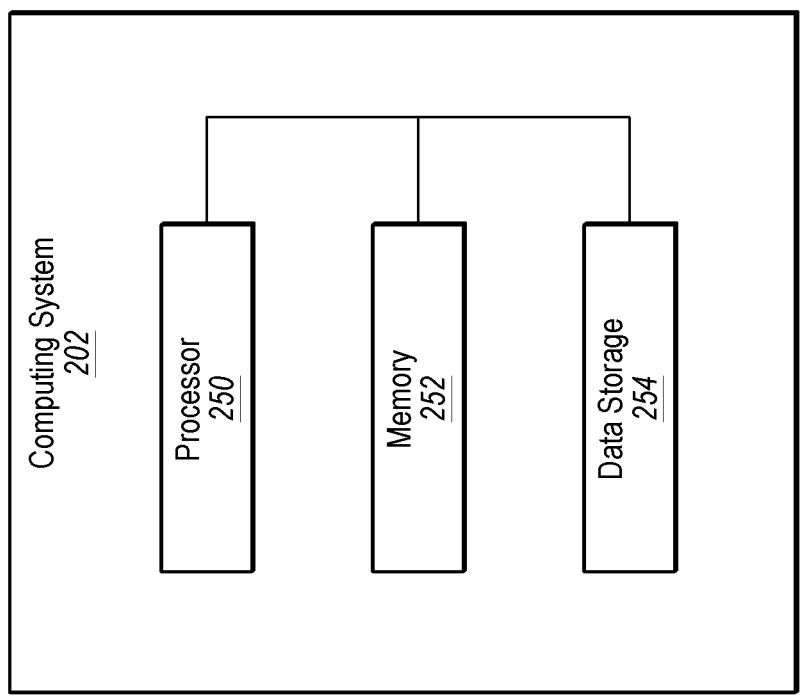
FIG. 2 illustrates an example computing system that may be configured to repair a software program.

FIG. 2 illustrates a block diagram of an example computing system 202, according to at least one embodiment of the present disclosure. The computing system 202 may be configured to implement or direct one or more operations associated with a repair module (e.g., the repair module 106). The computing system 202 may include a processor 250, a memory 252, and a data storage 254. The processor 250, the memory 252, and the data storage 254 may be communicatively coupled.

In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 250 may include any number of processors configured to, individually or collectively, perform or direct performance of any number of operations described in the present disclosure. Additionally, one or more of the processors may be present on one or more different electronic devices, such as different servers.

In some embodiments, the processor 250 may be configured to interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions.

For example, in some embodiments, the repair module may be included in the data storage 254 as program instructions. The processor 250 may fetch the program instructions of the repair module from the data storage 254 and may load the program instructions of the repair module in the memory 252. After the program instructions of the repair module are loaded into memory 252, the processor 250 may execute the program instructions such that the computing system may implement the operations associated with the repair module as directed by the instructions.

The memory 252 and the data storage 254 may include computer-readable storage media for carrying or having computer-executable instructions or data structures stored thereon. Such computer-readable storage media may include any available media that may be accessed by a general-purpose or special-purpose computer, such as the processor 250. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 250 to perform a certain operation or group of operations.

Modifications, additions, or omissions may be made to the computing system 202 without departing from the scope of the present disclosure. For example, in some embodiments, the computing system 202 may include any number of other components that may not be explicitly illustrated or described.

Figure 3:
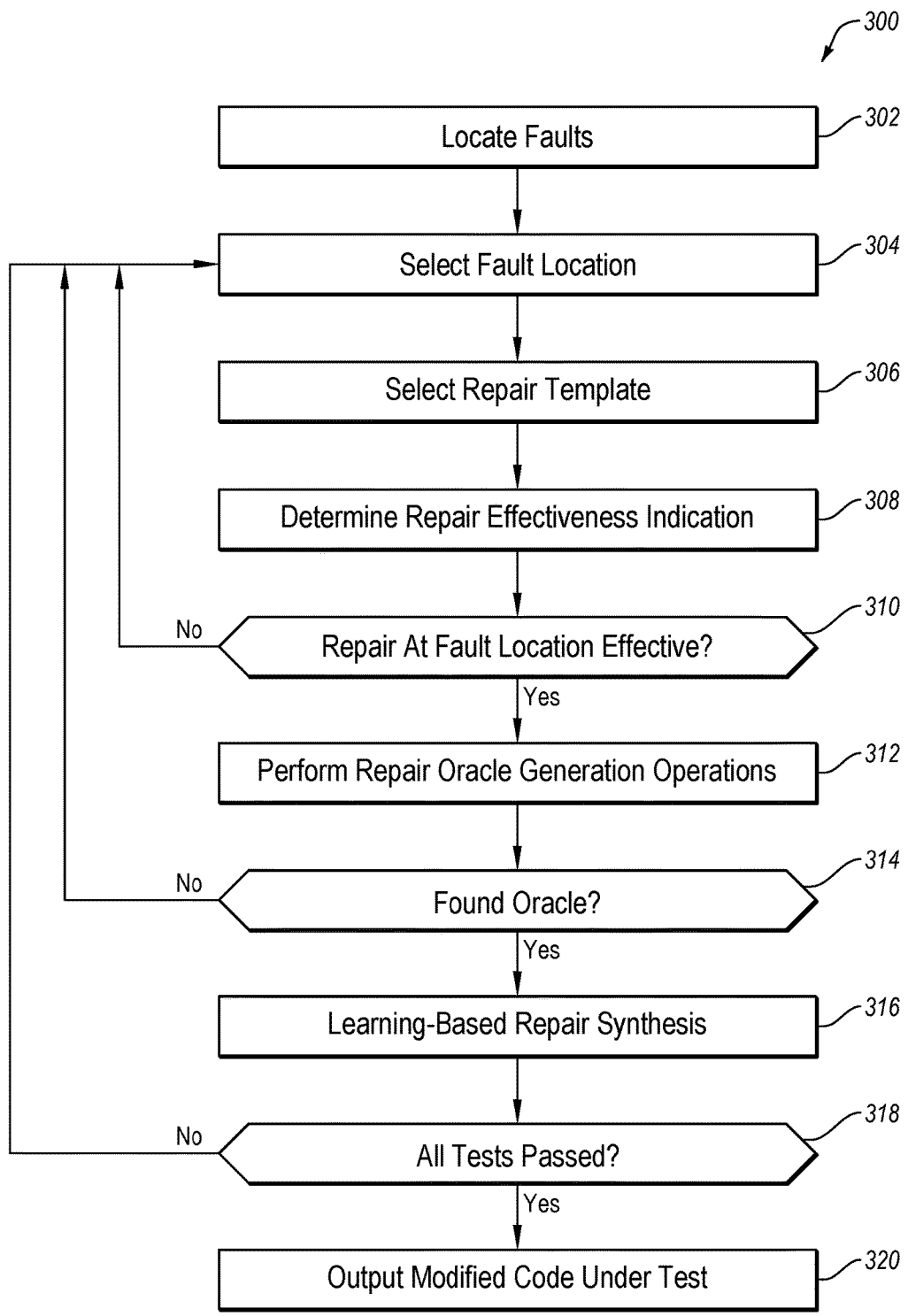
FIG. 3 is a flowchart of an example method of repairing a software program.

FIG. 3 is a flowchart of an example method 300 of repairing a software program, according to at least one embodiment described in the present disclosure. The method 300 may be performed by any suitable system, apparatus, or device with respect to code under test. For example, the repair module 106 of FIG. 1 or the computing system 202 of FIG. 2 (as directed by a repair module) may perform one or more of the operations associated with the method 300 with respect to the code under test 104. Although illustrated with discrete blocks, the steps and operations associated with one or more of the blocks of the method 300 may be divided into additional blocks, combined into fewer blocks, or eliminated, depending on the particular implementation.

The method 300 may begin at block 302, where one or more faults may be located in the code under test. The fault localization may be performed with respect to the code under test using any suitable technique. In some embodiments, the fault localization may locate one or more faults in the code under test and may be performed based on application of the one or more test suites to the code under test. The fault localization may identify one or more fault locations in some embodiments. Additionally or alternatively, the fault locations may be initially ordered based on their location in the code under test.

At block 304, a fault location of the identified fault locations may be selected. In some embodiments, the fault location may be selected according to a prioritization of the fault location with respect to one or more other fault locations. In some embodiments, the prioritization may initially be based on the ordering that may be performed at block 302. In these or other embodiments, the prioritization of one or more fault locations may change based on a repair effectiveness indication in which fault locations with a repair effectiveness indication that indicates that a repair at those locations may be relatively ineffective may have a lower priority than other fault locations.

At block 306, a repair template may be selected for the fault location. The repair template may include a certain type of repair that may be performed with respect to the fault location. In some embodiments, the repair template may include a repair that involves changing a condition in the code under test at the fault location.

At block 308, a repair effectiveness indication may be determined with respect to the fault location. As mentioned above, the repair effectiveness indication may indicate a potential effectiveness of performing a potential repair operation at the fault location. In some embodiments determining the repair effectiveness indication may include determining whether a difference exists between passing program states and failing program states at the fault location. In these or other embodiments, determining the repair effectiveness indication may include determining a compactness of a potential repair. In these or other embodiments, the compactness and difference determinations may be determined using machine learning such as decision-tree learning, case-based learning, inductive logic programming, a group method of data handling, learning automata, statistical relational learning, or any other suitable machine learning. Further explanation of the difference and compactness and their corresponding determination is given with respect to method 400 of FIG. 4.

In these or other embodiments, determining the repair effectiveness indication may include determining a diversity between passing test executions with respect to the fault location. In some embodiments, the diversity may include a diversity between passing test executions that lead to taking a "THEN" branch associated with a condition at the fault location and passing test executions that lead to taking an "ELSE" branch associated with the test condition. Further explanation of the diversity and its corresponding determination is given with respect to method 400 of FIG. 4.

At block 310, it may be determined whether performing a repair at the fault location may be effective. In some embodiments, the determination may be made based on the repair effectiveness indication determined at block 308. Additionally or alternatively, it may be determined based on whether a threshold associated with the repair effectiveness indication is satisfied. In some embodiments, in response to the threshold not being met, a prioritization of performing a repair at the fault location may be lowered. In these or other embodiments, the prioritization may be lowered such that a repair at the fault location may not be performed. In these or other embodiments, in response to the threshold being met, a prioritization of performing a potential repair at the fault location may be such that a repair at the fault location may be performed.

In response to it being determined that a potential repair at the fault location may be effective, the method 300 may proceed to block 312 in which one or more repair operations may be performed at the fault location. In response to it being determined that a potential repair at the fault location may be ineffective, the method 300 may return to block 304. In some embodiments, the determination as to whether a potential repair may be effective may be based on the prioritization, which may be determined based on satisfaction of the threshold discussed above. Further detail is given below with respect to the method 400 of FIG. 4 regarding determining a repair effectiveness indication and whether a potential repair may be effective based on a threshold and the repair effectiveness indication. In addition, further detail is given with respect to the method 400 of FIG. 4 regarding the prioritization.

At block 312, repair oracle generation operations may be performed. As indicated above, the repair oracle may be generated based on program states of the code under test at the fault location that correspond to passing or failing test executions. Further, as discussed above, the repair oracle may predict which states of the software program at the fault location may result in passing test executions at the fault location instead of resulting in failing test executions that may have led to identification of the fault location. In some embodiments, the repair oracle generation operations may be performed using machine learning. In these or other embodiments, the repair oracle may be generated based on an outcome of the machine learning that may be performed to determine the repair effectiveness indication.

For example, in some embodiments a failing state expression may be determined using machine learning. The failing state expression may indicate failing program states at the fault location. As detailed below, the failing state expression may be used to determine the difference and compactness mentioned above. In some embodiments, the failing state expression may be determined using decision-tree learning, case-based learning, inductive logic programming, a group method of data handling, learning automata, statistical relational learning, or any other suitable machine learning. The failing state expression may also be used to generate a repair oracle as discussed in detail below with respect to the method 400 of FIG. 4.

Additionally or alternatively, a hyperplane may be determined with respect to a condition statement at the fault location based on machine learning. Further, the repair oracle may be generated based on passing program states that lead to taking a "THEN" branch associated with the condition statement and based on passing program states that lead to taking and "ELSE" branch associated with the condition statement. In some embodiments, the hyperplane may be determined using support vector machine learning, self-training learning, generative models, graph based algorithms, multi-view learning algorithms, or any other suitable machine learning. Determination of the hyperplane and generation of the repair oracle based on the hyperplane is discussed in detail below with respect to the method 400 of FIG. 4.

At block 314, it may be determined whether the repair oracle generation operations found a repair oracle that may be used for generating repairs. For example, in some embodiments, the repair oracle generation operations may include operations in which a generated repair oracle may be applied to one or more failing test executions to predict what the states of the code under test should have been to obtain a passing test execution as opposed to a failing test execution. A repair oracle may be deemed to be found in response to previously failing test executions becoming passing test executions based on the predictions of the repair oracle. In contrast, a repair oracle may not be deemed to be found in response to previously failing test executions not becoming passing test executions based on the predictions of the repair oracle.

In response to it being determined that a repair oracle has been found at block 314, the method 300 may proceed to block 316. In response to it being determined that a repair oracle has not been found at block 314, the method 300 may return to block 304 to select another fault location.

At block 316, a learning-based repair synthesis may be performed. The learning-based repair synthesis may be performed using the repair oracle that may be generated at block 312. In some embodiments, the repairs may be synthesized using any suitable technique, including a heuristic technique or a machine learning technique that may be applied to the repair oracle.

At block 318, it may be determined whether all the test of the test suite may be passed after the repairs have been synthesized. In some embodiments, it may be determined whether previously failing test executions are transformed into passing executions as a consequence of the repair. For example, it may be determined whether or not the modifications made in the repair were such that the fault location is no longer deemed a fault location. In these or other embodiments positive tests may be performed to determine whether the modifications introduced other faults that were not previously present.

In response to determining that the tests were passed, the method 300 may proceed from block 318 to block 320. In response to determining that the tests were not passed, the method 300 may proceed from block 318 back to block 304 where another fault location may be selected.

At block 320, modified code under test may be output. The modified code under test may include modifications that may pass the tests of the test suite such that the modified code under test may include a repaired version of the code under test that may be received at block 302.

The method 300 may improve the efficiency of software program testing and repair. For example, the determining of the repair effectiveness indication and associated prioritization may reduce the amount of processing that may be performed. Further, the generation of the repair oracle based on machine learning and subsequent synthesis of the repairs based on the repair oracle may result in better and more efficient repairs being made than would be otherwise.

Modifications, additions, or omissions may be made to the method 300 without departing from the scope of the present disclosure. For example, the operations of method 300 may be implemented in differing order. Additionally or alternatively, two or more operations may be performed at the same time.

Furthermore, the outlined operations and actions are only provided as examples, and some of the operations and actions may be optional, combined into fewer operations and actions, or expanded into additional operations and actions without detracting from the essence of the disclosed embodiments.

In addition, in some embodiments, the method 300 may be performed iteratively in which a single fault location may be analyzed at a time. Additionally or alternatively, one or more operations associated with one or more blocks may be performed with respect to multiple fault locations at a time.

Figure 4:
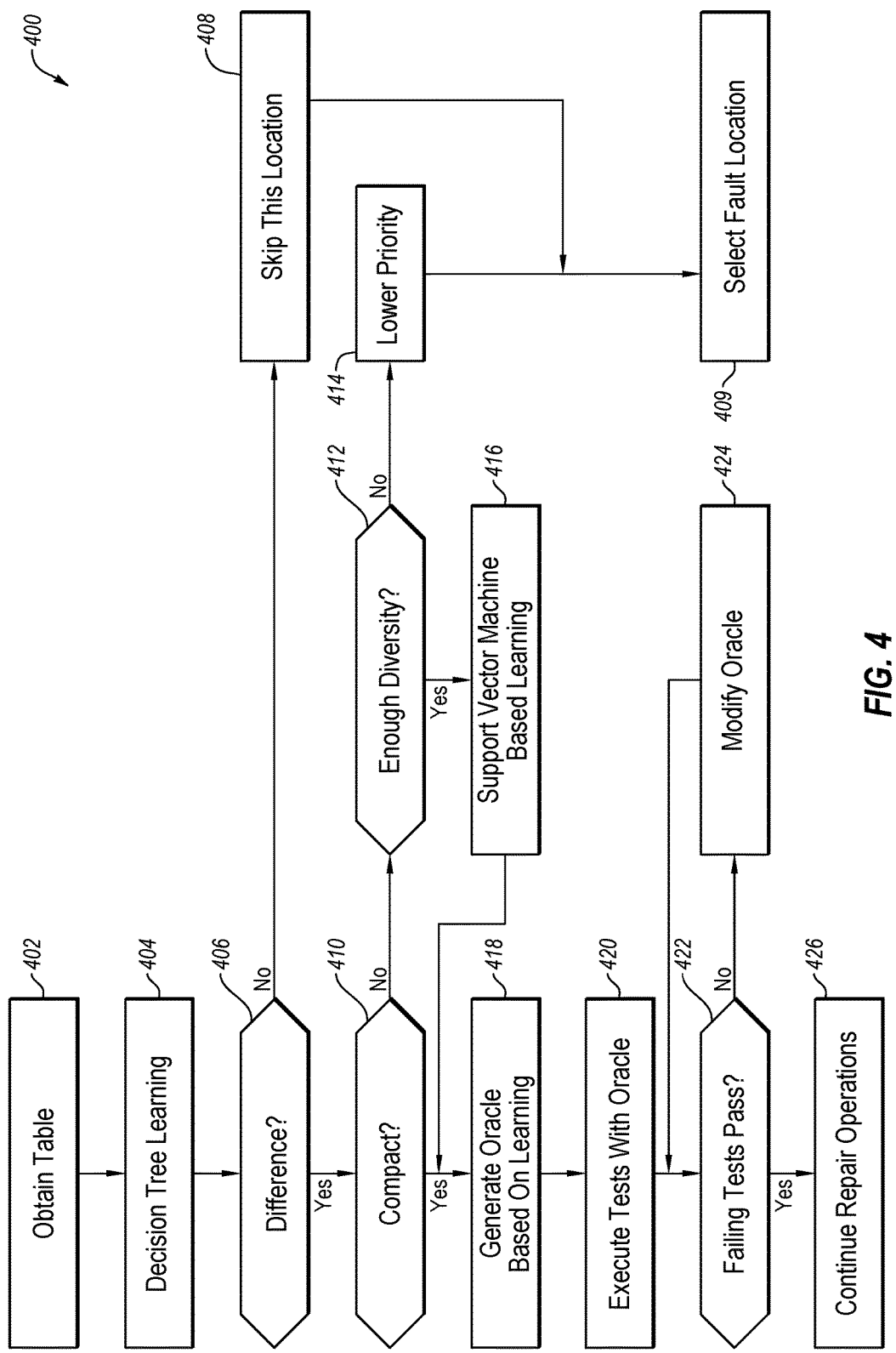
FIG. 4 is a flowchart of an example method of software program repair operations.

FIG. 4 is a flowchart of an example method 400 of software program repair operations, according to at least one embodiment described in the present disclosure. The method 400 may be performed by any suitable system, apparatus, or device with respect to code under test. For example, the repair module 106 of FIG. 1 or the computing system 202 of FIG. 2 (as directed by a repair module) may perform one or more of the operations associated with the method 400 with respect to the code under test 104. In addition, in some embodiments, one or more operations of the method 400 may be performed with respect to blocks 304, 308, 310, and 312 of the method 300 in some embodiments. Although illustrated with discrete blocks, the steps and operations associated with one or more of the blocks of the method 400 may be divided into additional blocks, combined into fewer blocks, or eliminated, depending on the particular implementation.

The method 400 may begin at block 402 in which a table that illustrates passing test executions, failing test executions, passing program states, and failing program states, of the code under test at a particular fault location may be obtained. In some embodiments, the particular fault location may coincide with the fault location that may be selected at block 304 of the method 300 described with respect to FIG. 3. In these or other embodiments, the table may be obtained based on the test executions that may have identified the particular fault location. Additionally or alternatively, one or more test executions may be performed at block 402 to obtain the table. In the present disclosure, reference to obtaining the table may include obtaining and organizing any data that may be linked to illustrate states of a software program (e.g., values of variables) at a fault location and resulting passing or failing test executions. By way of example, "Table 1" below illustrates an example table that may be obtained at block 402.

TABLE 1

| Tests | S1 | S2 | ... | SN |
| --- | --- | --- | --- | --- |
| Pass1 | V11 | V12 | ... | V1N |
| Pass2 | V21 | V22 | ... | V2N |
| Fail1 | V31 | V32 | ... | V3N |
| Fail2 | V41 | V42 | ... | V4N |

In Table 1, the fields in the column marked "Tests" may indicate whether a test execution passed or failed. The fields in the columns marked "S1" through "SN" may indicate values of variables of the code under test at the fault location that may indicate states of the code under test at the fault location.

For example, the column labeled "S1" may indicate values of a first state variable "S1" with respect to different states of the code under test. In particular, the fields below the "S1" field may include a first value of the first variable "S1" (indicated by "V11"), a second value of the first variable "S1" (indicated by "V21"), a third value of the first variable "S1" (indicated by "V31"), and a fourth value of the first variable "S1" (indicated by "V41"). The column labeled "S2" may similarly indicate values of a second state variable "S2" ("V12,", "V22," "V32," and "V42," respectively). Table 1 may include "N" number of columns up to "SN" to indicate all the different state variables and their associated variable values in some embodiments. The rows in Table 1 may accordingly indicate the different states of the code under test that may correspond to the different variable values.

At block 404, machine learning may be performed to determine a repair effectiveness indication for the fault location. In some embodiments, the machine learning may be performed using the information provided in the table that may be obtained at block 402. In some embodiments, the machine learning may include decision-tree learning, case-based learning, inductive logic programming, a group method of data handling, learning automata, statistical relational learning, or any other suitable machine learning.

By way of example, in some embodiments, decision tree learning may be used to analyze and compare the passing program states and the failing program states that may be included in the table obtained at block 402. Based on the comparison, the decision tree learning may attempt to identify observable differences between the passing program states and the failing program states at that fault location.

In these and other embodiments, the decision tree learning may be configured to generate an expression that explains the observed difference between the passing program states and the failing program states at that fault location. In some embodiments, the expression may include a failing state expression that may characterize the failing program states included in the table obtained at block 402 and that may exclude the passing program states included in the table obtained at block 402. By way of example, the following failing state expression may be generated based on the information included in Table 1 above: "((S1=V31)&& (S2=V32))||(S1=V41)"

At block 406, it may be determined whether an observable difference between the passing program states and failing program states was identified at block 404. For example, in instances in which an observable difference is not identified, the machine learning may not be able to generate an expression that characterizes the failing program states and that also excludes the passing program states. In such instances the failing state expression may be returned as "NULL." A "NULL" failing state expression may thus indicate that no observable difference between the passing program states and the failing program states was identified. In contrast, a failing state expression that is not "NULL" may indicate that an observable difference was identified.

In response to a determination that no observable difference was identified, the method 400 may proceed from block 406 to block 408. Not identifying an observable difference between passing program states and failing program states with respect to a particular fault location may indicate that performing repair operations at the particular fault location may not be very effective. As such, in some embodiments, at block 408, the fault location currently being analyzed may be given a lower priority and may be skipped. Following block 408, the method 400 may proceed to block 409 at which another fault location may be selected. Block 409 may be analogous to block 304 of the method 300 in some embodiments.

Returning to block 406, in response to a determination that an observable difference was identified, the method 400 may proceed from block 406 to block 410. At block 410 a compactness may be determined as a repair effectiveness indication. The compactness may indicate the complexity or simplicity of a potential repair, which may indicate its effectiveness.

In some embodiments, the compactness of a potential repair at the fault location may be determined based on the expression that may be derived at block 404 (e.g., based on a failing state expression derived at block 404). As such, a repair operation at a fault location that corresponds to a determination of a higher degree of compactness may indicate that a potential repair operation may be more effective at that fault location than at another fault location that corresponds to a determination of a lower degree of compactness.

In some embodiments, the compactness of the potential repair may be indicated by the expression itself. For example, fewer variables, operators, or clauses in a failing state expression may indicate a higher level of compactness as compared to another failing state expression that may have more variables, operators, or clauses. As such, in some embodiments, a determined compactness may include a determined number of one or more of the following: variables, operators, or clauses in a failing state expression.

In some embodiments, the determined compactness may be compared with a threshold to determine the repair effectiveness indication. For example, the number of variables, operators, or clauses in a failing state expression may be determined and compared with a corresponding threshold. In response to the number being greater than the threshold, it may be determined that a repair operation may not be as effective as compared to if the number was less than or equal to the threshold. In some embodiments, the threshold number of variable values or clauses in the failing state expression may be based on an empirical analysis. In some embodiments, in response to the determined compactness not satisfying the threshold (e.g., having a number of variable values or clauses greater than the threshold), the method 400 may proceed from block 410 to block 412.

At block 412, a diversity may be determined as a repair effectiveness indication in some embodiments. In some embodiments, the diversity may be based on a distribution of passing test executions of the table obtained at block 402 that may lead to taking a "THEN" branch associated with the condition statement at the fault location and of passing test executions of the table that may lead to taking an "ELSE" branch associated with the condition statement. A distribution between "THEN" passing test executions and "ELSE" passing test executions that may allow for machine-learning to determine a repair oracle may indicate that a sufficient diversity may exist between "THEN" passing test executions and "ELSE" passing test executions. A number of "THEN" passing test executions and a number of "ELSE" passing test executions for the distribution that may indicate sufficient diversity may be determined empirically in some embodiments.

In response to a determination of insufficient diversity, the method 400 may proceed from block 412 to block 414. A determination of insufficient diversity may indicate that performing repair operations at the particular fault location may not be very effective. As such, in some embodiments, at block 414, the fault location currently being analyzed may be given a lower priority. Following block 414, the method 400 may proceed to block 409 at which another fault location may be selected.

Further, in some embodiments, the diversity may be determined in response to the fault location including a condition statement whereas the compactness determination may be made with respect to a larger variety of statement types. As such, in some instances in which the fault location does not include a condition statement and the compactness is not sufficiently high (e.g., does not satisfy the threshold) the method 400 may proceed from block 410 to block 414.

Returning to block 412, in response to a determination of sufficient diversity, the method 400 may proceed from block 412 to block 416. At block 416, machine learning may be performed with respect to the "THEN" passing test executions and the "ELSE" passing test executions. In particular, support vector machine learning may determine to the passing program states associated with the "THEN" passing test executions and to the passing program states associated with the "ELSE" passing test executions based on the variable values that correspond to the passing program states. The determined values may be plotted in a hyperspace that is based on the variables. Based on the distribution of "THEN" passing program state plots and "ELSE" passing program state plots in the hyperspace, a hyperplane that separates the different types of plots may be determined. As indicated and described below with respect to block 418, the hyperplane and hyperspace may be used to generate a repair oracle in some embodiments. In these or other embodiments, the machine learning that may be performed at block 416 may also include self-training machine learning, generative model machine learning, graph based algorithms, multi-view learning algorithms, or any other suitable machine learning.

Following block 416, the method 400 may proceed to block 418. Additionally, in some embodiments, in response to the compactness determined at block 410 satisfying the threshold (e.g., having a number of variable values or clauses less than the threshold), the method 400 may proceed from block 410 to block 418.

At block 418, a repair oracle may be generated based on the machine learning that may be performed at block 404 or at block 416. For example, in some embodiments the repair oracle may be generated based on a failing state expression that may be generated at block 404. In particular, as indicated above, a particular failing state expression may indicate which conditions may result in failing test executions at a particular fault location. As such, for a failing program state at the particular fault location, the repair oracle may be generated based on the corresponding failing state expression such that an opposite direction in the code under test may be taken than that previously taken with the particular failing state expression. For example, the particular failing state expression may be represented by "f" and the particular failing program state may result in a condition "c" of an "IF" condition statement associated with a particular fault location. The corresponding repair oracle may replace the condition "c" with "f XOR c" to flip the condition statement such that an opposite path may be taken than that taken based on the particular failing program state.

In these or other embodiments, the repair oracle may be generated based on the plotted hyperspace and the hyperplane that may be determined at block 416. For example, the hyperplane may indicate whether the "ELSE" branch or the "THEN" branch should be taken at the fault location based on the state at the fault location. In particular, a state valuation may be determined for a particular state and may be plotted in the hyperspace. In response to the plotted valuation being on the "ELSE" side of the hyperplane, it may be predicted that the "ELSE" branch should be taken. Similarly, in response to the plotted valuation being on the "THEN" side of the hyperplane, it may be predicted that the "THEN" branch should be taken. Such predictions may be used as the repair oracle in some embodiments.

At block 420, one or more test executions may be performed with respect to the repair oracle that may be generated at block 418. In some embodiments, during the test executions, program state predictions may be made and implemented based on the repair oracle. In some embodiments, one or more of the test executions performed may be previous test executions that were failing test executions.

At block 422, it may be determined whether the previously failing test executions are now passing in response to the predictions made by the repair oracle. The previously failing test executions now passing may indicate the repair oracle is good and the method 400 may proceed from block 422 to block 426 in response to the previously failing test executions now passing. At block 426, one or more further repair operations may be performed. For example, in some embodiments, the operations at block 426 may include one or more operations described with respect to one or more of blocks 314, 316, 318, and 320 described with respect to method 300 of FIG. 3.

Returning to block 422, in response to one or more previously failing test executions not passing even with the repair oracle predictions, the method 400 may proceed from block 422 to block 424. At block 424, the repair oracle may be modified. In some embodiments, the repair oracle may be modified using any other suitable oracle generation techniques. For example, one or more clauses in the repair oracle may be modified in a heuristic, random, or brute-force manner. Following block 424, the method 400 may return to block 422.

Modifications, additions, or omissions may be made to the method 400 without departing from the scope of the present disclosure. For example, the operations of method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

In addition, in some embodiments, the method 400 may be performed iteratively in which a single fault location may be analyzed at a time. Additionally or alternatively, one or more operations associated with one or more blocks may be performed with respect to multiple fault locations at a time.

As indicated above, the embodiments described in the present disclosure may include the use of a special purpose or general purpose computer (e.g., the processor 250 of FIG. 2) including various computer hardware or software modules, as discussed in greater detail below. Further, as indicated above, embodiments described in the present disclosure may be implemented using computer-readable media (e.g., the memory 252 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
   identifying a fault location in a software program using a test suite;
   determining, using machine learning, a repair effectiveness indication that indicates a potential effectiveness of performing a potential repair operation at the fault location;
   prioritizing implementing a repair at the fault location based on the repair effectiveness indication satisfying a threshold;
   generating, using machine learning, a repair oracle for the fault location in response to the repair effectiveness indication satisfying the threshold and based on program states that correspond to states of the software program at the fault location that pass or fail one or more test executions of tests from the test suite; and
   performing repair operations with respect to the fault location of the software program using the repair oracle based on the prioritization of the fault location.

2. The method of claim 1, wherein determining the repair effectiveness indication includes:
   determining a failing state expression that indicates failing program states at the fault location, the failing program states corresponding to states of the software program at the fault location that fail one or more test executions of tests from the test suite;
   determining a compactness of the potential repair at the fault location based on the failing state expression; and
   determining the repair effectiveness indication based on the compactness of the potential repair.

3. The method of claim 2, further comprising determining the failing state expression using decision tree learning.

4. The method of claim 1, wherein determining the repair effectiveness indication includes:

determining whether an observable difference between passing program states and failing program states at the fault location is identified, the passing program states corresponding to states of the software program at the fault location that pass one or more test executions of tests from the test suite and the failing program states corresponding to states of the software program at the fault location that fail one or more test executions of tests from the test suite; and determining the repair effectiveness indication based on the observable difference determination.

5. The method of claim 4, further comprising performing the observable difference determination based on a failing state expression that indicates failing program states at the fault location.

6. The method of claim 1, wherein determining the repair effectiveness indication includes:

determining a diversity between passing test executions of tests of the test suite that lead to taking a "THEN" branch associated with a condition statement at the fault location and passing test executions of tests of the test suite that lead to taking an "ELSE" branch associated with the condition statement; and determining the repair effectiveness indication based on the diversity determination.

7. The method of claim 1, wherein generating the repair oracle includes:

determining a failing state expression that indicates failing program states at the fault location, the failing program states corresponding to states of the software program at the fault location that fail one or more test executions of tests from the test suite; and generating the repair oracle based on the failing state expression.

8. The method of claim 1, wherein generating the repair oracle includes:

determining a hyperplane with respect to a condition statement at the fault location; and generating, based on the hyperplane, the repair oracle based on passing program states that lead to taking a "THEN" branch associated with the condition statement, as indicated by the hyperplane, and passing program states that lead to taking an "ELSE" branch associated with the condition statement, as indicated by the hyperplane, the passing program states corresponding to states of the software program at the fault location that pass one or more test executions of tests from the test suite.

9. The method of claim 1, further comprising generating a repair at the fault location based on the repair oracle.

10. One or more non-transitory computer-readable storage media including computer-executable instructions configured to, in response to execution by one or more processors, cause a system to perform operations, the operations comprising:

identifying a fault location in a software program using a test suite;

determining, using machine learning, a repair effectiveness indication that indicates a potential effectiveness of performing a potential repair operation at the fault location;

prioritizing implementing a repair at the fault location based on the repair effectiveness indication satisfying a threshold;

generating, using machine learning, a repair oracle for the fault location in response to the repair effectiveness indication satisfying the threshold and based on program states that correspond to states of the software program at the fault location that pass or fail one or more test executions of tests from the test suite; and performing repair operations with respect to the fault location of the software program using the repair oracle based on the prioritization of the fault location.

11. The one or more non-transitory computer-readable storage media of claim 10, wherein determining the repair effectiveness indication includes:

determining a failing state expression that indicates failing program states at the fault location, the failing program states corresponding to states of the software program at the fault location that fail one or more test executions of tests from the test suite;

determining a compactness of the potential repair at the fault location based on the failing state expression; and determining the repair effectiveness indication based on the compactness of the potential repair.

12. The one or more non-transitory computer-readable storage media of claim 11, wherein the operations further comprise determining the failing state expression using decision tree learning.

13. The one or more non-transitory computer-readable storage media of claim 10, wherein determining the repair effectiveness indication includes:

determining whether an observable difference between passing program states and failing program states at the fault location is identified, the passing program states corresponding to states of the software program at the fault location that pass one or more test executions of tests from the test suite and the failing program states corresponding to states of the software program at the fault location that fail one or more test executions of tests from the test suite; and determining the repair effectiveness indication based on the observable difference determination.

14. The one or more non-transitory computer-readable storage media of claim 13, wherein the operations further comprise performing the observable difference determination based on a failing state expression that indicates failing program states at the fault location.

15. The one or more non-transitory computer-readable storage media of claim 10, wherein determining the repair effectiveness indication includes:

determining a diversity between passing test executions of tests of the test suite that lead to taking a "THEN" branch associated with a condition statement at the fault location and passing test executions of tests of the test suite that lead to taking an "ELSE" branch associated with the condition statement; and determining the repair effectiveness indication based on the diversity determination.

16. The one or more non-transitory computer-readable storage media of claim 10, wherein generating the repair oracle includes:

determining a failing state expression that indicates failing program states at the fault location, the failing program states corresponding to states of the software program at the fault location that fail one or more test executions of tests from the test suite; and generating the repair oracle based on the failing state expression.

17. The one or more non-transitory computer-readable storage media of claim 10, wherein generating the repair oracle includes:

determining a hyperplane with respect to a condition statement at the fault location; and generating, based on the hyperplane, the repair oracle based on passing program states that lead to taking a "THEN" branch associated with the condition statement, as indicated by the hyperplane, and passing program states that lead to taking an "ELSE" branch associated with the condition statement, as indicated by the hyperplane, the passing program states corresponding to states of the software program at the fault location that pass one or more test executions of tests from the test suite.

18. The one or more non-transitory computer-readable storage media of claim 10, wherein the operations further comprise generating a repair at the fault location based on the repair oracle.

19. A system comprising:
one or more non-transitory computer-readable storage media including computer-executable instructions;
one or more processors communicatively coupled to the one or more computer-readable storage media and configured to, in response to executing the computer-executable instructions, cause the system to perform operations, the operations comprising:
identifying a fault location in a software program using a test suite;
determining, using machine learning, a repair effectiveness indication that indicates a potential effectiveness of performing a potential repair operation at the fault location;
prioritizing implementing a repair at the fault location based on the repair effectiveness indication satisfying a threshold;
generating, using machine learning, a repair oracle for the fault location in response to the repair effectiveness indication satisfying the threshold and based on program states that correspond to states of the software program at the fault location that pass or fail one or more test executions of tests from the test suite; and
performing repair operations with respect to the fault location of the software program using the repair oracle based on the prioritization of the fault location.

* * * * *